Patented Oct. 5, 1937

2,095,129

UNITED STATES PATENT OFFICE 2,095,129

CELLULOSIC MATERIALS AND METHODS OF MAKING SAME

Donald E. Drew, Kenmore, N. Y., assignor, by mesne assignments, to E. I. du Pont de Nemours & Company, Wilmington, Del., a corporation of Delaware No Drawing. Application March 19, 1935, Serial No. 11,816

22 Claims. (Cl. 91—68)

This invention relates to improvements in cellulosic materials, and more particularly it relates to improvements in the durability, serviceability and general utility of cellulosic pellicles and the method of making the same. The invention is particularly applicable to the production of regenerated cellulose sheets and films whereby to greatly enhance their physical characteristics and consequently their utility to manufacturer, converter and consumer.

Transparent, regenerated cellulose pellicles are prepared commercially by regeneration of a cellulosic solution, washing, bleaching and otherwise purifying the sheets, impregnating the wet or gel sheets with an aqueous solution of a suitable softener (usually glycerol) and finally drying the softened pellicles over a series of heated rolls. At this stage the transparent, regenerated cellulose pellicles consist essentially of cellulose, water and a softener. Such pellicles, prepared from cellulose xanthate solutions, are known in the trade as plain sheets as differentiated from the further treated sheets, such as lacquered, waterproofed or moistureproofed varieties.

Commercial plain transparent regenerated cellulose pellicles usually contain, when manufactured, 5% to 8% moisture, and 9% to 15% softener (glycerol). The glycerol, being substantially non-volatile, remains practically unchanged in concentration in the sheets from the time of manufacture to the time of final use. The moisture, however, while existing to the extent of 5% to 8% in the newly manufactured sheets is subject to wide and almost instantaneous changes whenever the sheets are exposed to the surrounding air.

Transparent, regenerated cellulose sheets containing 14% glycerol and 6% moisture are sufficiently pliable and durable to meet practically all the handling and folding requirements in their use. I have found, however, that any substantial decrease in that amount of moisture results in so great embrittlement of the film that fracture of the sheet, as on a wrapping machine, or breakage of bags containing candies, etc., causes great losses, often exceeding 75%, of such wrappers or containers as are ordinarily used in commerce. It is therefore apparent that moisture, in addition to glycerol, has a very important role in softening, and hence influences the utility of plain transparent regenerated cellulose sheets.

As stated above, the moisture exists in the pellicle in equilibrium with that of the surrounding atmosphere. In comparison with paper products, the amount of adsorbed moisture in plain transparent cellulose sheets varies over a very wide range as the relative humidity of the surrounding atmosphere varies. Thus, at normal temperatures with the surrounding atmosphere at 10%, 35% and 60% relative humidity, transparent regenerated cellulose contains approximately 1.5%, 6.5% and 13.0% moisture, respectively. Only a few minutes' exposure of a sheet which has been in contact with an atmosphere of 60% relative humidity to an atmosphere of 10% relative humidity is required to reduce the moisture from 13.0% to 2.0%.

The best results for wrapping and packaging have heretofore been obtained with transparent, regenerated cellulose sheeting when it contains moisture in equilibrium with the surrounding atmosphere having a relative humidity of approximately 35%, that is, approximately 5-8% moisture. In the manufacture of regenerated cellulose pellicles, this moisture content is obtained during drying by very careful control and constant supervision and analysis. While still in the manufacturer's plant, room humidities are controlled to maintain the moisture content of any exposed sheets at the manufactured moisture content. These precautions are expensive, subject to variation and require constant vigilance. Furthermore, after leaving plants of rigid control, such as in shipment and in use on grocers' shelves, etc., the plain transparent, regenerated cellulose products are at the mercy of variable weather conditions. During winter in temperate zones, transparent, regenerated cellulose sheets when in use, particularly indoors, are almost constantly subjected to relatively dry atmospheres, averaging about 20% relative humidity, and often as low as 5% relative humidity. During these seasons the moisture content of the sheeting is so low that breaking of the pellicles in use increases many fold over that during summer.

Though winter breakage has existed seasonally ever since the manufacture and sale of transparent, regenerated cellulose sheeting began, there has been no substantial reduction in the ratio of winter breakage to summer breakage. Such advances as have been made have been in design and method of packaging, manufacturing precautions and so forth. My invention teaches how transparent, regenerated cellulose pellicles can be manufactured and used with almost complete elimination of increase in breakage during seasons of low atmospheric humidities and in fact with an improvement in serviceability during all seasons. Other improvements will also be apparent.

I have found that an approximately two-fold increase in the softener content of the transparent regenerated cellulose pellicles above the customary 14% results in a sheet which retains its durability even when substantially no adsorbed moisture is present, and which further presents a greatly increased durability when containing the normal moisture content.

In spite of the fact that it was known that plain, transparent regenerated cellulose pellicles could be made containing large quantities of glycerol without harm to the appearance of the product, no such product has heretofore been in commercial use. There have been certain insurmountable practical reasons why commercial transparent regenerated cellulose sheets have seldom exceeded a glycerol content of 15% and have therefore been forced to accept drastic seasonal breakage. There exists at least one principal property of transparent regenerated cellulose pellicles which has limited the practical increase in glycerol content to approximately 15%.

Plain transparent, regenerated cellulose sheets are very smooth, and pliable. When sheets are stacked on one another or wound tightly in rolls, the film of air is expelled from between the sheets. Since they are impermeable to air, they are held together by atmospheric pressure. The more pliable the sheet (the greater the softener content), the more readily will the air be expelled, the more perfectly will one sheet conform to any slight unevenness in the adjacent sheet and the more difficult will be the subsequent separation of the sheets. Adherence of adjacent sheets is further augmented by the nature of the surface of plain, transparent regenerated cellulose sheets. Their surfaces are somewhat plastic and tend toward tackiness. Surface tackiness or tendency to cohesion of adjacent sheets in stacks or rolls increases greatly with increased moisture content, as can be demonstrated by slipping one sheet over another between the hands and then holding the sheets between the hands a few minutes until they have absorbed moisture, and again attempting to slide one sheet over the other. The same increase in surface tackiness exists when the moisture content remains unchanged and the glycerol content of the sheet is increased. Years of experience have shown that the maximum glycerol content which can be tolerated in plain, transparent regenerated cellulose sheets and still insure that the sheet can be rapidly and readily taken from a stack, as for wrapping, is approximately 15%. Even then, precautions are taken to prevent absorption of moisture by stacks when not in use, for example, by storing them in a properly humidified room, by wrapping stacks and rolls with moistureproof sheets during storage, or by avoiding long periods of storage, and it is furthermore desirable to store them under as little pressure as possible. To have increased the glycerol content above the aforementioned maximum would have resulted in losses both to the manufacturer and consumer by sticking or caking greater than the seasonal loss by winter breakage. To have increased it to 25% would have resulted in complete loss by caking.

My invention makes possible the commercial use of plain, transparent, regenerated cellulose pellicles containing as much as twice as much, or even more, softener than the present maximum by preventing any increase in sticking tendency of adjacent sheets over that now encountered with the present pellicle containing the present maximum of approximately 15% glycerol.

It is an object of this invention to produce a new and useful cellulosic film. Another object pertains to a new method of making cellulosic film. A still further object comprehends the production of new and useful films comprising a substantially non-fibrous, non-porous material such as regenerated cellulose, having improved resistance to breakage when subjected to low humidity, for example, during cold weather. A further object of this invention pertains to improvements in the sticking resistance of cellulosic film. Another object comprises improvements in the manufacture of cellulosic film whereby to diminish the amount of shrinkage occurring during the manufacture of cellulosic film having an increased resistance to sticking. Other objects of the invention will appear hereinafter.

Although the process of this invention is particularly applicable to pellicles of regenerated cellulose, whether produced by the cuprammonium or viscose processes, it is also applicable to cellulosic pellicles which are smooth, dense, non-fibrous and substantially non-porous, particularly those water-sensitive cellulosic pellicles such as may be obtained by coagulation and/or precipitation from aqueous cellulosic dispersions, including cellulose ethers such as glycol cellulose, lowly substituted methyl or ethyl cellulose, cellulose glycolic acid, or cellulose phthalic acid; lowly esterified cellulose esters or etheresters, and the like.

In order to more clearly set forth the details of the invention without prolixity, the invention will be described with specific reference to pellicles of regenerated cellulose. It is to be understood, however, that the invention may be likewise applied to the production of other cellulosic pellicles of the type mentioned above.

Generally speaking, the process is best applied to pellicles in the gel state, that is, as they are obtained in the course of manufacture in the purified and washed but undried state. However, it is possible to apply the principles of this invention to pellicles which have been dried by subjecting them to a re-wetting step during or prior to the treatment afforded by the present invention. Obviously, it is much more economical and practical to work with the pellicle in the gel state. Although transparent pellicles are to be preferred, it is within the scope of the invention to use pigmented, colored, or otherwise decorated pellicles. The process, furthermore, does not interfere with subsequent treatments, including lamination, coating, gluing, or the like. Thus, the products of this invention may be provided with surface coatings, as, for example, moistureproof surface coatings without harmful effects due to the treatment according to this invention.

The invention in its preferred form contemplates the use of glycerol as the cellulose softener. It is to be understood, however, that any water-soluble, substantially non-volatile, cellulose softener may be used, such as, diethylene glycol, triethylene glycol, invert cane sugar, glucose, sorbitol, calcium chloride, triethanolamine, carbamide, etc., or suitable combinations of such softeners. The invention is independent, however, of the type of softener used and indeed relatively volatile softeners may be used, or the softener may be omitted if occasion demands.

In accordance with the present invention, it has been found that the tendency for highly softened pellicles to stick together may be overcome by applying to the pellicle a sizing or anti-sticking agent which will impart resistance toward cohesion without impairing the normally desirable properties of the pellicle. Thus, it has been found that when cellulosic pellicles of the type described are surfaced with an anti-sticking agent comprising an extremely thin layer of a normally solid wax or wax-like substance and/or a soap or soap-like substance, and optionally a resin of suitable characteristics, sticking or caking of adjacent sheets is practically eliminated, and slipperiness of one sheet over another is increased.

According to the invention the anti-sticking agents are applied to transparent, regenerated cellulose sheets during impregnation of the softener, or thereafter, in such a manner that practically no impairment in appearance or performance of the dried product results. Preferably the anti-sticking agents are applied as aqueous dispersions and/or solutions during the softening treatment, that is, in the treating bath containing the aqueous softener solution and just prior to drying. Before entering the dryer, the excess anti-sticking agent, together with the excess softener solution, may be removed by suitable squeeze rolls, scraper rods or doctor knives, or the like. The amount of anti-sticking agent which is applied is controlled by adjusting the concentration of the anti-sticking agent in the treating bath, or by varying the amount of excess removed. If it is desired to apply the anti-sticking agent separately, the pellicle may be treated with the softener bath, the excess removed as indicated above and then the solution or dispersion of anti-sticking agent applied by dip rolls, sprays or the like. It is preferred not to immerse the softener-treated pellicle in a separate treating bath containing only the anti-sticking agent since part of the softener would be removed from the pellicle.

Among the substances which are waxes, wax-like, or approach waxiness, and which may be used in the anti-sticking agent, may be mentioned hydrogenated oils, e. g. hydrogenated castor oil, higher fatty acids, wax-like fatty acid esters, high carbon alcohols, paraffin, Montan wax, shellac wax, or similar vegetable and/or synthetic waxes or wax-like substances.

The term "wax" as used throughout the specification and claims, unless otherwise modified, is to be considered as including waxes, wax-like substances and substances approaching waxiness in nature, as outlined in the preceding paragraph.

As resins which may be used in the anti-sticking agent in accordance with this invention may be mentioned resin substances such as natural (undewaxed) shellac, cumar resin, rosin, or sodium salts of abietic acid.

Among the soap materials suitable for use in the anti-sticking agent there are sodium or potassium salts of fatty acids such as stearic, oleic, lauric, ricinoleic and so forth, triethanolamine soaps, the sodium or other alkali metal sulfuric acid esters of the higher fatty alcohols such as stearyl, oleyl, lauryl, cetyl and myristyl alcohols, and sulfonated oils and their salts, e. g. sodium petroleum sulfonate, or similar substances, may be used.

Mixtures of the above are usually preferred, since a single substance can seldom be found which imparts all the properties of the product which are required. One or more substances of the same class, or different classes may be combined depending on the properties desired. Thus, the higher, normally solid fatty acids, such as stearic, may be used in combination with one of the other agents mentioned above, e. g. triethanolamine stearate. While it is preferred to use principally the above types of materials, there may be included with them soluble, inorganic salts such as sodium bicarbonate, or suspended insoluble salts such as calcium phosphate, or albuminous materials which substances may have some use in stabilizing the dispersion, or other specific use. It is preferred generally to avoid the use of any appreciable quantity of oily material or soft waxy substances since they generally markedly reduce the anti-sticking qualities of the composition. They may, however, be employed to advantage at times in preparation of suitable dispersions or for clarifying the composition, imparting gloss, and so forth.

Any of the well known methods may be used to obtain suitable treating dispersions such as specific emulsifying agents, stabilizing agents, or methods or combinations to obtain desirable dispersions. For example, small amounts of organic solvents may be used to facilitate the preparation of suitable aqueous dispersions as well as any suitable steps for introducing the various substances into the dispersions or treating baths. The treating baths may contain dispersions, emulsions, suspensions, true solutions and/or colloidal solutions.

Inasmuch as the treating bath is generally of the nature of a dispersion and/or generally contains a soap, it is preferable to use soft water in preparing the treating bath. Furthermore, it is preferred that the pellicle to be treated should be washed with soft water before being introduced into the treating bath. This last is particularly true when the process is carried on in a continuous manner, for if hard water is used for washing and is not removed prior to the sizing treatment, the carry-over by the pellicle will gradually build up a hard water content in the treating bath which will eventually be detrimental to the stability of the sizing composition.

Preferably only very minute quantities of anti-sticking substances are applied to the transparent regenerated cellulose pellicles, which substances, after drying of the pellicle, will usually and preferably amount to less than two per cent of the product and may even amount to as little as a few hundredths per cent.

In carrying out the sizing treatment, it is essential that the dispersion or solution be so prepared, that the quantity be so controlled and that drying be so carried out that the final product is substantially not inferior to similar unsized products, particularly in retention of transparency and brilliance and receptiveness to the usual aqueous adhesives. Furthermore, the product should resist cohesion, such as caking of stacked sheets when stored under pressure and/or exposed to atmospheres of high humidity as much or more than similar unsized sheets, even though the product may contain approximately twice as much softening agent as the unsized product. For this reason many restrictions are placed on the sizing or anti-sticking compositions.

The sizing compositions should generally contain but relatively small amounts of hard waxes such as carnauba wax Montan wax, etc., since these waxes when used as major constituents of the composition prevent gluing of the sized sheet with the usual aqueous adhesives. Resinous materials may be used in the composition for clarifying the sizing agent and increasing gloss but should not be used in large quantities, for, while they appear in no way to produce any semblance of a tacky surface, they greatly reduce the cohesion-resisting property of the product, as well as somewhat impair gluing with aqueous adhesives. One desirable feature of soaps is that they improve the receptiveness of the sized product to aqueous adhesives. Both wax-like and resinous substances when added to soaps increase their sticking resistance. Certain materials such as stearic acid, wax-like esters of stearic acid, hydrogenated castor oil, etc., impart good sticking resistance without appreciably impairing the sensitiveness to aqueous glues.

For the practice of the invention it is usually most convenient to prepare concentrated solutions, dispersions or the like of suitable anti-sticking compositions and then appropriate amounts of these concentrates may be added to the proper treating bath in order to produce the results desired. The following examples will be illustrative of typical concentrates which may be used in accordance with the invention.

Example I

| | Parts by weight |
|---|---|
| Stearic acid | 10 |
| Water | 79 |
| Ammonium hydroxide (35%) | 1 |

The water and ammonium hydroxide are mixed and heated to about 80° C., whereupon the previously melted stearic acid is added gradually with vigorous stirring. The resultant dispersion of stearic acid will serve as a concentrate in the practice of the invention.

Example II

| | Parts by weight |
|---|---|
| Stearic acid | 10 |
| Triethanolamine | 2 |
| Alcohol | 50 |
| Water | 50 |

The stearic acid is heated to 80–90° C. The triethanolamine is dissolved in the molten acid. The molten solution is dissolved in the alcohol and the water is added, the temperature being held at about 50° C. The resultant clear solution, when diluted by addition to the proper treating bath, produces a very finely dispersed mixture of triethanolamine stearate soap and stearic acid, the particles of which are suitable for uniform application in accordance with the invention.

Example II—A

| | Parts by weight |
|---|---|
| Stearic acid | 10 |
| Triethanolamine | 5 |
| Water | 285 |

The stearic acid is melted and heated to 80–90° C., whereupon the triethanolamine is added and dissolved in the melt. After thorough mixing, the water is added, the temperature of the mixture being maintained preferably at 50–90° C. The soap solution so obtained may be added to the proper treating bath in proportions to produce the desired sizing or anti-sticking results.

Example III

| | Parts by weight |
|---|---|
| Potassium cocoanut oil soap | 7 |
| Carnauba wax | 3 |
| Water | About 56.6 |

The carnauba wax in the form of a commercially available aqueous dispersion containing 15% wax is added to an aqueous solution of potassium cocoanut oil soap containing 15% soap, the two being combined in the ratio of 3:7 respectively to give a composition approximately of the proportions set forth above.

Example IV

| | | Parts by weight |
|---|---|---|
| (A) | Glycol stearate | 4 |
| | Hydrogenated castor oil | 16 |
| | Water | 79 |
| | Ammonium hydroxide | 1 |
| (B) | Abietic acid | 100 |
| | Sodium carbonate | 25 |
| | Water | 100 |

Water for dilution to 20% solids.

Composition A is prepared by dissolving the glycol stearate in the hydrogenated castor oil and adding the molten mixture, with vigorous stirring, to the mixed water and ammonium hydroxide, the temperature being held at about 90–100° C.

Composition B is prepared by heating the mixed specified ingredients at about 90° C. until no further evolution of carbon dioxide is observed, whereupon sufficient water is added to produce a 20% solution of sodium abietate.

A mixed concentrate containing the hydrogenated castor oil, glycol stearate and sodium abietate in a ratio of about 3:1:1 respectively may be obtained by mixing equal parts by weight of compositions A and B. If desired, however, the compositions A and B may be added separately to the treating bath to provide the desired concentrations and/or ratios.

The following examples will illustrate practical applications of the invention in the production of transparent, highly softened, non-sticking, durable, cellulosic pellicles. For convenience, the examples will describe applications of the invention to regenerated cellulose pellicles, but this is not to be considered as limitative.

Example V

A pellicle of gel regenerated cellulose of such thickness as will yield a final dry thickness of about 0.0009″ is passed through a softening bath which contains in addition to the softening agent, the desired amount of anti-sticking sizing agent. The bath, in this instance, contains about 9% glycerol and 0.1 to 0.15% dispersed stearic acid, the latter having been supplied by the addition of an appropriate amount of the composition set forth in Example I. On leaving the bath, the pellicle is passed through squeeze rolls to remove excess solution and then dried to a final moisture content of about 5% by passing over drier rolls heated to about 65–75° C. A final transparent pellicle of softened, sized, regenerated cellulose is thus obtained which contains, in addition to cellulose and moisture, about 23% glycerol and 0.05–0.2% stearic acid (based on the bone-dry weight of the product) and preferably weighing about 30 grams per square meter.

The stearic acid exists as a more or less uniform film over the surface of the pellicle and imparts to it a high degree of slipperiness. Sheets of this highly softened, sized, regenerated cellulose may be stacked and stored under a pressure of about one pound per square inch in an atmosphere having about 80% relative humidity for as long as two weeks without exhibiting such a tendency to stick or cake that individual sheets are inseparable from adjacent sheets. If the stearic acid treatment were omitted, stacked sheets so highly softened with glycerol would cake immediately on cutting and indeed similar unsized regenerated cellulose sheeting containing only 14% glycerol would become caked in less than one week under such conditions of storage.

Additionally, the sized pellicle may be readily glued with commercial aqueous adhesives customarily used for gluing commercial regenerated cellulose pellicles. Furthermore, the product is from two to five times more durable than the previously available material when exposed to normal indoor, winter atmospheres having 10–25% relative humidity.

It is to be understood, of course, that suitable means will be provided to maintain the treating bath at the proper composition so as to compensate for the softening and sizing agents removed by the pellicle in the course of its treatment.

*Example VI*

A pellicle of gel regenerated cellulose is treated as in Example V, except that the treating bath contains 9% glycerol and enough of the sizing composition described in Example II to furnish 0.1–1.0% of the combined triethanolamine soap and stearic acid. The product is similar to that described in Example V.

*Example VII*

A pellicle of gel regenerated cellulose similar to that of Example V is passed through a treating bath containing 9% glycerol and 0.1–0.4% of a sizing or anti-sticking agent consisting of a mixture of potassium cocoanut oil soap and carnauba wax which may be supplied by the use of an appropriate amount of the concentrate composition of Example III. The sizing agents may be added separately, if desired, rather than as the combined concentrate of Example III by using a soap solution and a wax emulsion in amounts which will provide the desired soap: wax ratio of about 7:3. After removal of the excess treating bath by means of squeeze rolls or the like, the pellicle is dried as by passing over a series of heated drier rolls. To obtain the greatest brilliance or clarity of surface, it is preferable to increase the drying temperature at least during the latter stages of drying, to about 85–90° C., thus enabling the wax to flux with the soap.

Although the anti-sticking agent of this example does not interfere with the use of ordinary aqueous adhesives for gluing, any appreciable increase in the proportion of wax with respect to the soap very greatly reduces the receptivity of the product towards these aqueous adhesives. Additionally, the application of more than 0.5% of the anti-sticking agent (based on the bone-dry weight of the final product) should be avoided since the amounts exceeding this impair the receptivity towards aqueous adhesives while not materially improving the resistance to sticking.

Furthermore, if it is desired to produce a cellulosic pellicle which will show satisfactory sticking resistance, but which will not be receptive to the usual aqueous adhesives, this can be accomplished by omitting the potassium cocoanut oil soap from the sizing composition.

The product so obtained is highly satisfactory as a stick-resistant pellicle but requires the use of specially prepared aqueous adhesives or an adhesive comprising an organic solvent if it is used for purposes which require gluing of the pellicle to itself or other pellicles, etc.

*Example VIII*

A pellicle of gel regenerated cellulose of such thickness as will yield a final dry thickness of about 0.0012" is treated in a manner similar to that set forth in Example VI, using a treating bath containing an additional 2% of glycerol. The final product in this case will contain about 26% glycerol and will be transparent with a high degree of slipperiness (several times as resistant to sticking as a 14% glycerol, non-treated product despite a nearly twofold increase in softener content) and capable of being readily glued by aqueous adhesives. Furthermore, the treated pellicle is about five times as durable as the commercial untreated material containing the usual amount of glycerol when the moisture content of both is reduced to about 1% and is, in fact, equal to or even better in durability when containing only about 1% moisture than the commercial untreated material containing the normal 5–8%.

*Example IX*

A pellicle of gel regenerated cellulose of such thickness as will yield a final dry thickness of about 0.0012" is treated in the manner set forth in Example V, using a treating bath containing 11% glycerol and sufficient of the sizing or antisticking composition described in Example IV to provide a total sizing agent concentration of 0.2–0.5%. When the treated pellicle is dried, it is preferable to heat the pellicle to a temperature of about 90° C. during the latter stages of drying to obtain the best brilliance, gloss and clarity.

In this example, although the sizing agent contains a relatively large amount of waxy material (hydrogenated castor oil), it does not interfere with the adequate gluing with aqueous adhesives. If the sodium abietate (composition "B" of Example IV) is omitted, the product will show increased sticking resistance, but may be slightly hazy.

*Example X*

A pellicle of gel regenerated cellulose of such thickness as will yield a final dry thickness of about 0.0012" is treated in the manner set forth in Example V using a treating bath containing 11% glycerol and 0.2–1% of a shellac dispersion composed of the following ingredients in approximately the proportions:

| | Parts by weight |
|---|---|
| Shellac | 10 |
| Alcohol | 60 |
| Water | 40 |
| Ammonium hydroxide | 1 |

The shellac used may be bleached or unbleached and should preferably contain a relatively high quantity of the vegetable wax, so-called shellac wax, which normally exists in the crude shellac.

The highly softened pellicle obtained in accordance with this example is transparent, very glossy, gluable with aqueous adhesives and resists sticking by pressure. The surface insulation of shellac also increases its resistance towards moisture absorption. The sticking resistance is appreciably decreased by elimination of the natural wax from the shellac.

*Example XI*

A pellicle of gel regenerated cellulose is passed through a softening bath containing about 10% triethylene glycol and 0.2-1.0% of carnauba wax and sodium abietate in a ratio of 4:6. The excess bath is removed and the softened film dried and preferably heated to about 90° C., when substantially dry, to flux the sizing components.

The product obtained is transparent, glossy, gluable with aqueous adhesives, has a high degree of slipperiness and is flexible and durable when substantially all its adsorbed moisture is expelled. Stacks of sheets may be stored for long periods without caking so that they cannot readily be separated.

The sodium abietate is preferably added to the softener bath as a 10–50% solution in water. The carnauba wax is added as a 10–20% aqueous dispersion, which dispersion is obtained by any suitable means as with sulfonated oils or soaps and may be stabilized with a suitable albuminous material, as gelatin, casein, or the like.

As has been indicated above, cellulosic pellicles of the type described which are dense, non-fibrous and substantially impermeable possess a remarkably smooth surface. Customarily, such pellicles are dried by passing them in a continuous manner over a series of drier rolls and the surface of these rolls is usually smooth so that the surface of the pellicle will not be marred during its passage thereover. As the pellicle is dried, it tends to shrink in width and with smooth rolls the shrinkage is more or less unrestricted in the case of the usual untreated pellicle so that considerable loss in width is experienced. It might be expected, therefore, that a pellicle treated in accordance with the present invention to improve the sticking resistance would present a still smoother surface to the drier rolls which would result in even greater shrinkage in width as the pellicle is dried.

As a matter of fact, this situation does obtain when sizing or anti-sticking agents consisting predominantly of soap are used in the practice of this invention. It has been found, however, and surprisingly so, that many of the sizing or anti-sticking compositions within the scope of the invention are capable of preventing this shrinkage to such an extent as will result in no greater loss in width than would be experienced if no sizing treatment were given. This can be done without sacrificing improvement in sticking resistance and in many instances without sacrificing the receptivity of the pellicle to the usual aqueous adhesives.

Thus it is that the sizing composition of Example IV, which may be used as described in Example IX will result in the production of a cellulosic pellicle which will suffer no greater shrinkage during the drying operation than a similar but untreated cellulosic pellicle. Similarly, a pellicle prepared according to Example X will suffer no loss in width over that shown by an untreated pellicle.

On the other hand, the use of sizing compositions which are predominantly resinous in nature, for example, compositions containing a larger percentage of resin than soap, wax or their equivalent as above described, may result in the production of a cellulosic pellicle which will adhere so well to the drier rolls that only a small amount of shrinkage will take place. The shrinkage may be even less than that exhibited by an untreated pellicle and consequently wider pellicles can be obtained. Pellicles so treated will be about the equivalent of untreated pellicles of normal softener content as regards anti-sticking properties, will be easily gluable with the usual aqueous adhesives, for example, and will be equally adaptable to subsequent coating operations, or the like.

It is also possible to omit the anti-sticking materials, namely, the soaps or waxes and the like from the sizing composition altogether and use only a resin-containing size whereby to obtain an increased production. Such compositions may have particular utility in methods where the anti-sticking characteristics are of minor importance or where the sized sheet is later to be coated with a composition which will somewhat eliminate the sticking of juxtaposed sheets. The methods and compositions covering this invention are described and claimed in the copending application, Serial No. 11,817, filed Mar. 19, 1935 to D. E. Drew.

It will be seen from the foregoing that in the preparation of the product it is necessary to overcome certain obstacles which are not encountered in any other product now known. Whereas stacks of transparent regenerated cellulose sheets are readily caked or stuck together by increases in moisture and pressure, paper, being porous, less hygroscopic and relatively rough of surface, exhibits no such action. Even the "glassine" papers, which most nearly approach transparent regenerated cellulose film, are free from caking or sticking. Cohering and gluing of transparent, regenerated cellulose sheets differ widely from any such problem which is encountered in the paper field. Even the most dense of papers is sufficiently porous that a wide variety of adhesives, for example, starch-paste, casein, dextrine and gelatin agglutinants provide suitable adhesion. Plain transparent, regenerated cellulose sheets, on the other hand, are smooth, non-fibrous and impervious to the usual colloidal agglutinant products and hence require specially compounded adhesives to secure proper adhesion to the smooth and substantially impermeable surface. Therefore, sizing or anti-sticking agents which would in no way affect the gluing properties of glassine paper, for example, would so prevent the wetting and adhesion of an aqueous adhesive on the surface of transparent regenerated cellulose pellicles that no useful adhesion whatsoever would result. It thus becomes apparent that a sizing or anti-sticking agent which will improve the sticking resistance of regenerated cellulose pellicles and at the same time permit the pellicles to remain receptive to aqueous adhesives which are satisfactory for use with untreated pellicles, constitutes an outstanding contribution to the art. Needless to say, there are many uses to which cellulosic pellicles of the type described might be put wherein the anti-sticking characteristic is of major import while the receptivity to aqueous adhesives is of little concern. In such cases a pellicle having improved sticking resistance, regardless of its receptivity to aqueous adhesives, will be useful and the production of such pellicle is well within the scope of the present invention.

Also, adhesion of printing inks to surfaced transparent, regenerated cellulose pellicles is often greatly impaired except where the gluable compositions of the present invention are employed.

Some steps have been taken in the transparent, regenerated cellulose field to minimize caking of stacked sheets. Such substances as soluble and insoluble silicates or albuminous materials have been used, as well as dusting the dried film with chalk, etc. All these methods and substances failed in some particular in producing highly softened, sticking-resistant, transparent, regenerated cellulose film. In order to produce a degree of sticking resistance comparable to that of the present invention, dusting, as with chalk, or application of soluble and insoluble silicates must be carried to such an extent that the usefulness of the product is totally lost on account of the excessive haziness of the product. Albuminous materials, while generally resulting in non-hazy products, do not impart a sticking resistance comparable to that of this invention.

Certain treatments have been developed for imparting moistureproofness and/or waterproofness to transparent regenerated cellulose sheets. While these treatments may generally be applied to highly softened sheets to produce transparent, sticking-resistant products, they invariably result in products which cannot be glued with commercial aqueous adhesives. Furthermore, such processes require a second step, as of applying lacquers after the film has been dried and wound up. One very practical feature of the process of this invention is that it may be carried out at practically no increase in cost and without any alteration in the machine usually used for producing transparent regenerated cellulose sheets or in the method for subsequent handling by the manufacturer or converter or consumer.

The highly softened cellulosic sheets represent a further increase in utility since they are much more durable at freezing temperatures than the usual commercial products.

It is obvious that these anti-sticking substances may be applied with great advantage to transparent regenerated cellulose sheets containing the usual quantity of softening agent especially when such products are to be used in territories of high atmospheric humidity, to overcome the often-experienced sticking of adjacent sheets by absorption of moisture.

By the term "size", as used throughout the specification and claims, is meant the application to a sheet of non-fibrous cellulosic material, preferably in the gel or wetted state, a substance which will modify the surface characteristics of the finished and dried sheet so that the same will be prevented from sticking to adjacent sheets under adverse conditions of high humidity when the latter are pressed together, even though the cellulosic sheets contain a much larger percentage of a softening agent than may be practicably incorporated in an untreated sheet.

It is to be understood that all variations or modifications which conform to the spirit of the invention are intended to be included within the scope of the claims.

I claim:

1. A moisture permeable regenerated cellulose pellicle containing a water soluble softener and an anti-sticking composition which contains a soap, said composition being present in such amount as to prevent any appreciable adhesion to contiguous pellicles in storage.

2. A moisture permeable regenerated cellulose pellicle containing a water soluble softener and an anti-sticking composition which contains a soap and a resin, the said composition being present in such amount as to prevent any appreciable adhesion to contiguous pellicles in storage.

3. A moisture permeable regenerated cellulose pellicle containing a water soluble softener and an anti-sticking composition which contains a resin and a soap, said soap being present in a larger percentage than said resin, the said composition being present in such amount as to prevent any appreciable adhesion to contiguous pellicles in storage.

4. A moisture permeable regenerated cellulose pellicle containing a water soluble softener and an anti-sticking composition which contains a wax and a soap, said composition being present in such amount as to prevent any appreciable adhesion to contiguous pellicles in storage.

5. A moisture permeable regenerated cellulose pellicle containing a water soluble softener and an anti-sticking composition which contains a wax and a fatty acid soap, said composition being present in such amount as to prevent any appreciable adhesion to contiguous pellicles in storage.

6. A moisture permeable regenerated cellulose pellicle containing a water soluble softener and an anti-sticking composition which contains a wax and a triethanolamine soap, said composition being present in such amount as to prevent any appreciable adhesion to contiguous pellicles in storage.

7. A moisture permeable regenerated cellulose pellicle containing a water soluble softener and an anti-sticking composition which contains a wax and triethanolamine stearate, said composition being present in such amount as to prevent any appreciable adhesion to contiguous pellicles in storage.

8. A moisture permeable regenerated cellulose pellicle having good anti-sticking properties and high durability at low humidity, containing an excess of 15% of glycerine as a softener therefor, and containing triethanolamine stearate in an amount less than 2% by weight of the pellicle.

9. In the method of forming a moisture permeable water sensitive non-fibrous cellulosic pellicle, the step which comprises treating said pellicle with an aqueous dispersion of an anti-sticking composition which contains a substance taken from the class consisting of waxes, soaps, and normally hard, high fatty acids.

10. In the method of forming a moisture permeable water sensitive non-fibrous cellulosic pellicle, the step which comprises treating said pellicle, prior to the drying thereof, with a water soluble softener and with an aqueous dispersion of an anti-sticking composition which contains a substance taken from the class consisting of waxes, soaps, and normally hard, high fatty acids.

11. In the method of forming a moisture permeable water sensitive non-fibrous cellulosic pellicle, the step which comprises treating said pellicle, prior to the drying thereof, with a water soluble softener and with an aqueous dispersion of an anti-sticking composition which contains a resin and a substance taken from the class consisting of waxes, soaps, and normally hard, high fatty acids.

12. In the method of forming a moisture permeable water sensitive non-fibrous cellulosic pellicle, the step which comprises treating said pellicle, prior to the drying thereof, with a water soluble softener and with an aqueous dispersion of an anti-sticking composition which contains a substance taken from the class consisting of waxes, soaps and normally hard, high fatty acids, said composition being present in such concentration that it will form not more than 2% of the finished pellicle.

13. In the method of forming a moisture permeable regenerated cellulose pellicle, the step which comprises treating said pellicle, prior to the drying thereof, with a water soluble softener and with an aqueous dispersion of an anti-sticking composition which contains a substance taken from the class consisting of waxes, soaps and normally hard, high fatty acids, said composition being present in such concentration that it will form not more than 2% of the finished pellicle.

14. In the method of forming a moisture permeable water sensitive non-fibrous cellulosic pellicle, the step which comprises simultaneously treating said pellicle prior to the drying thereof, with a water soluble softener and with an aqueous dispersion of an anti-sticking composition which contains a substance taken from the class consisting of waxes, soaps, and normally hard, high fatty acids.

15. In the method of forming a moisture permeable water sensitive non-fibrous cellulosic pellicle, the step which comprises treating said pellicle, prior to the drying thereof, with a water soluble softener and with an aqueous dispersion of an anti-sticking composition which contains a soap.

16. In the method of forming a moisture permeable water sensitive non-fibrous cellulosic pellicle, the step which comprises treating said pellicle, prior to the drying thereof, with a water soluble softener and with an aqueous dispersion of an anti-sticking composition which contains a resin and a soap.

17. In the method of forming a moisture permeable water sensitive non-fibrous cellulosic pellicle, the step which comprises treating said pellicle, prior to the drying thereof, with a water soluble softener and with an aqueous dispersion of an anti sticking composition which contains a wax and a soap.

18. In the method of forming a moisture permeable water sensitive non-fibrous cellulosic pellicle, the step which comprises treating said pellicle, prior to the drying thereof, with a water soluble softener and with an aqueous dispersion of an anti-sticking composition which contains a wax and a fatty acid soap.

19. In the method of forming a moisture permeable water sensitive non-fibrous cellulosic pellicle, the step which comprises treating said pellicle, prior to the drying thereof, with a water soluble softener and with an aqueous dispersion of an anti-sticking composition which contains a wax and a triethanolamine soap.

20. In the method of forming a moisture permeable water sensitive non-fibrous cellulosic pellicle, the step which comprises treating said pellicle, prior to the drying thereof, with a water soluble softener and with an aqueous dispersion of an anti-sticking composition which contains a wax and triethanolamine stearate.

21. A moisture permeable water sensitive non-fibrous cellulosic pellicle containing a water-soluble softener and an anti-sticking composition which contains a soap, said composition being present in such amount as to prevent any appreciable adhesion to contiguous pellicles in storage.

22. A moisture permeable water sensitive non-fibrous cellulosic pellicle containing a water-soluble softener and an anti-sticking composition and which contains a soap and a resin, the said composition being present in such amount as to prevent any appreciable adhesion to contiguous pellicles in storage.

DONALD E. DREW.